UNITED STATES PATENT OFFICE.

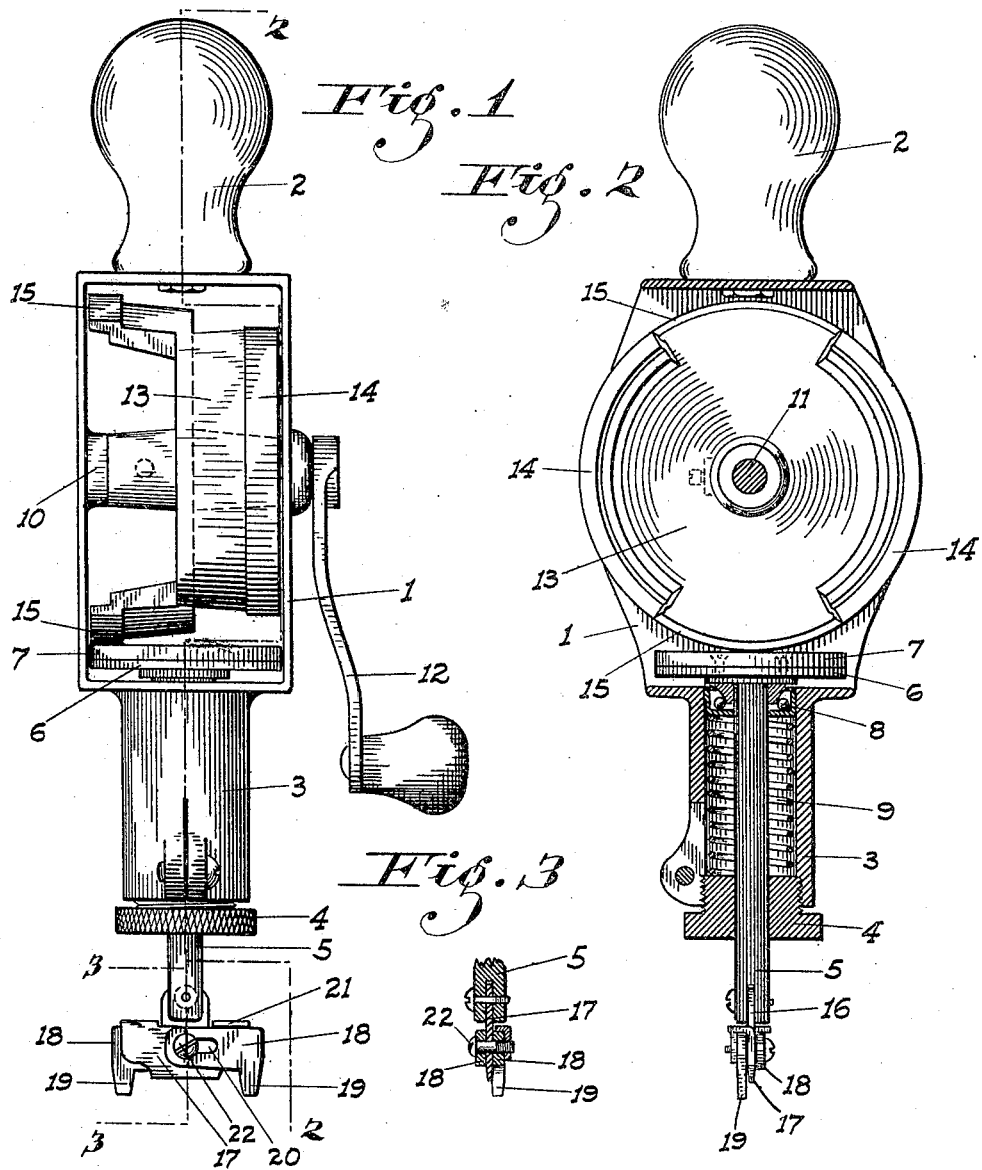

ALFRED D. GOODWIN, OF RIPON, CALIFORNIA.

OPERATING MEANS FOR VALVE-GRINDING TOOLS.

1,326,190. Specification of Letters Patent. Patented Dec. 30, 1919.

Application filed July 18, 1918. Serial No. 245,443.

*To all whom it may concern:*

Be it known that I, ALFRED D. GOODWIN, a citizen of the United States, residing at Ripon, in the county of San Joaquin, State of California, have invented certain new and useful Improvements in Operating Means for Valve-Grinding Tools; and I do declare the following to be a full, clear, and exact description of the same, reference being had to the accompanying drawings, and to the characters of reference marked thereon, which form a part of this application.

This invention relates to improvements in manually operated valve grinding tools for the standard type of puppet valves of gas engines, the principal object of the invention being to provide such a tool as will grind a valve in its seat so that such valve will have an evenly bearing surface all around and be perfectly gas-tight.

With the means used at present for grinding or reseating a valve, such as a screwdriver, brace and bit, and the like, the operator is very apt to grind the valve more in one seated position than another which tends to produce an uneven seating of the valve should it move out of that one position, whereas with my improved tool, a rotating motion backward and forward of the same repeated arcs of travel is constantly imparted to the valve by the turning of a crank at any desired speed by the operator.

A further object is to provide a tool which may be used with any size or style of valve without the necessity of fitting separate parts to the device for each size of valve.

As a third object I have produced a device which is simple and inexpensive of construction and easy of operation and yet exceedingly efficient for the purpose for which it is designed.

These objects I accomplish by means of such structure and relative arrangement of parts as will fully appear by a perusal of the following specification and claims.

On the drawings similar characters of reference indicate corresponding parts in the several views.

Figure 1 is an end elevation of the complete tool.

Fig. 2 is a sectional side elevation taken relatively on a line 2—2 of Fig. 1.

Fig. 3 is a cross-section of a valve engaging member taken on a line 3—3 of Fig. 1.

Fig. 4 is a side elevation of the valve engaging member showing the same as used for a slot-head valve.

Referring now more particularly to the figures of reference, I provide a substantially rectangular hollow frame 1 having a hand-hold 2 centrally positioned on top thereof.

The under side of the frame 1 is provided with a downwardly extending tubular portion 3, in the bottom of which is screwed a knurled nut 4 provided with a centrally positioned hole, through which passes a rotatable and slidable rod 5. The upper end of the rod is provided with a disk 6 secured thereon projecting into the hollow portion of the frame 1, on which disk is secured a friction disk 7, formed of a material such as friction-paper or any similar suitable material.

Slidably seated in the tubular portion 3 on the rod 5 is a ball race 9, bearing against the under side of the disk 6, a helical spring 10 being interposed around the rod between the ball race and the nut 4.

The frame 1 is provided with centrally positioned bosses 10 which form bearings for a shaft 11 one end of which extends through to the outside of the frame and is secured to a suitable crank handle 12.

Secured on the shaft 11 in the frame 1 is a circular friction-cam member 13. This member has a pair of diametrically opposed cams 14 on one side thereof and adapted to frictionally engage the friction disk 7 near the periphery thereof, while a similar pair of diametrically opposed cams 15 is positioned on the other side of the member 13 and adapted to bear against the friction disk 7 near the periphery thereof but on the opposite side of the vertical axis of the disk from the bearing point of the cams 14.

These cams 15 are so positioned circumferentially with regard to cams 14 that the end of frictional engagement of one will be the beginning of the engagement of the other, and the cams 14 have an arc length approximately twice that of the cams 15. Thus it will be seen that with the turning of the handle 12, a rotary motion is imparted to the cam member 13 and thence to the opposite edges of the disk 7 alternately, by which means the direction of rotation of the disk 7 and the rod thereon is constantly changed, and on account of the different lengths of the opposed friction surfaces of the cams 14 and 15, a greater rotative movement will be had in one direction than in the other, and hence the valve will be constantly advanced around its seat.

The lower end of the rod 5 is forked as at 16, in which fork is pivoted a cross-arm 17, the lower edge of which is adapted to fit the slot in the head of a valve.

Adjustably fulcrumed on either side of the member 17 are bars 18, having lugs 19 normally extending downward from the outer ends thereof to engage the usual sockets in a valve-head of that type.

Each bar 18 has a horizontal slot 20 therein, to allow of adjustment of the same for different spacing of the valve-sockets, and is held normally horizontal by means of a flange 21 on each opposite end of the member 17 projecting over the top edges of the bars 18.

When it is desired to use the slot engaging means, the position of the bars 18 is reversed as shown in Fig. 4, thus holding the lugs 19 out of the way, the bars being held in this position by tightening the screw 22 on which they are fulcrumed.

From the foregoing description it will be readily seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claims.

Having thus described my invention, what I claim as new and useful and desire to secure by Letters Patent is:—

1. An operating means for valve grinding tools comprising a hollow frame, a handle extending upwardly and a boss extending downwardly from the frame, a vertical rod rotatably and slidably mounted in the boss, a disk on the upper end of the rod projecting into the hollow portion of the frame, a shaft extending through the frame at right angles to the axis of the vertical rod, a rotatable cam member secured on the shaft comprising diametrically opposed cam surfaces on one side thereof adapted to frictionally engage the disk near the periphery thereof and diametrically opposed cam surfaces on the other side between the first named cam surfaces adapted to frictionally engage the disk near the periphery thereof at a point thereon diametrally opposite from the point of engagement of the first named cam surfaces, one pair of said cam surfaces having an arc length in excess of the other pair, and a handle means on the shaft outside of the frame whereby the cam member may be rotated.

2. The combination described in claim 3, and spring tension means in the boss to press upwardly against the disk whereby the frictional tension of the same with the cam surfaces is constantly maintained.

In testimony whereof I affix my signature in presence of two witnesses.

ALFRED D. GOODWIN.

Witnesses:
VERADINE WARNER,
BERNARD PRIVOT.